United States Patent [19]

Hackleman et al.

[11] Patent Number: 4,566,193

[45] Date of Patent: Jan. 28, 1986

[54] USE OF AN ELECTRONIC VERNIER FOR EVALUATION OF ALIGNMENT IN SEMICONDUCTOR PROCESSING

[75] Inventors: David E. Hackleman, Monmouth; Richard F. Adams; Wayne P. Richling, both of Corvallis, all of Oreg.

[73] Assignee: Hewlett-Packard Company, Palo Alto, Calif.

[21] Appl. No.: 636,480

[22] Filed: Jul. 31, 1984

[51] Int. Cl.[4] .................. G01B 7/00; G08C 21/00
[52] U.S. Cl. ....................... 33/1 D; 33/180 R; 377/24; 340/870.37
[58] Field of Search ........... 33/10, 180 R, 286, 174 R, 33/533; 340/870.37, 347; 377/24; 334/82

[56] References Cited

U.S. PATENT DOCUMENTS

| | | | |
|---|---|---|---|
| 3,221,256 | 11/1965 | Walden | 340/870.37 |
| 3,297,941 | 1/1967 | Wolfendale | 340/870.37 |
| 3,873,916 | 3/1975 | Sterki | 340/870.37 |
| 3,961,318 | 6/1976 | Farrand et al. | 340/870.37 |
| 4,459,702 | 7/1984 | Medwin | 33/1 D |

OTHER PUBLICATIONS

B. M. M. Henderson, A. M. Gundlach & A. J. Walton, "Integrated Circuit Test Structure Which Uses a Vernier to Electrically Measure Mask Misalignment, Electronics Letters, Oct. 12, 1983, vol. 10, No. 21, pp. 868-869.

Primary Examiner—Willis Little
Attorney, Agent, or Firm—Douglas L. Weller

[57] ABSTRACT

An electronic vernier is presented which detects and quantifies misalignment between layers of material deposited upon a semiconducting wafer. Verniers may be constructed which evaluate alignment between two conducting layers, between two conducting layers and an insulating layer and between a semiconducting layer and a capacitive layer. Circuitry is described which shows how output from a vernier may be detected and quantified in order to evaluate the amount of misalignment.

8 Claims, 12 Drawing Figures

1

USE OF AN ELECTRONIC VERNIER FOR EVALUATION OF ALIGNMENT IN SEMICONDUCTOR PROCESSING

BACKGROUND

Processing integrated circuits requires the deposit of many layers of material upon a semiconductor wafer. Precise alignment of each layer with every other layer is necessary to assure correct functioning of a finished product. Traditionally this alignment has been done by an operator examining a circuit under a microscope or by other means using optics.

SUMMARY OF THE INVENTION

In accordance with the preferred embodiments of the present invention an electronic vernier for the evaluation of alignment of layers in semiconductor processing is provided. The embodiments provided include verniers for aligning a first conducting layer to a second conducting layer; a conducting layer to a non-conducting layer; and a semiconducting layer to a capacitive layer.

DESCRIPTION OF THE PREFERRED EMBODIMENT

Figure 1A:
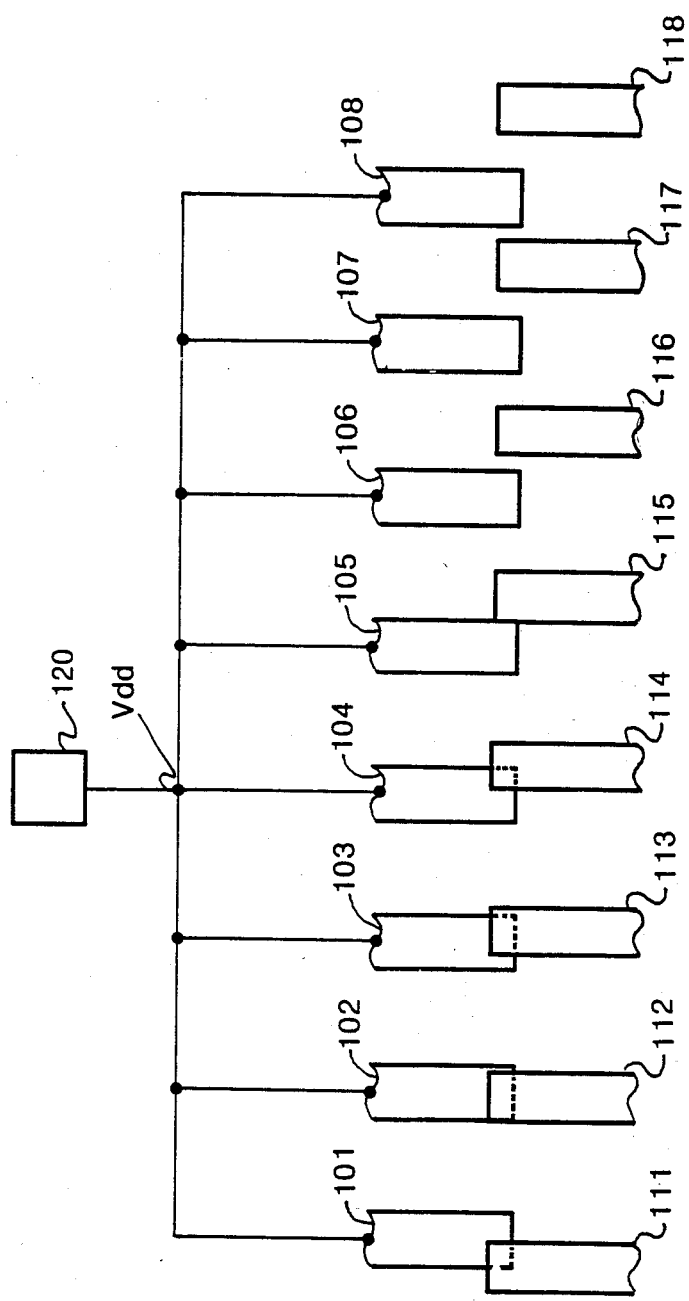
FIGS. 1A-1F show an embodiment of a vernier for aligning two conductive layers.

FIG. 1A shows a design for an electronic digital vernier for integrated circuit (IC) process evaluation. Conducting strips 101-108 are part of a first conducting layer on an IC. Conducting strips 111-118 are part of a second conducting layer on the IC. The second layer is adjacent to the first layer. As can be seen from FIG. 1A conducting strip 101 is in contact with conducting strip 111, conducting strip 102 is in contact with conducting strip 112, conducting strip 103 is in contact with conducting strip 113, conducting strip 104 is in contact with conducting strip 114, and conducting strip 105 is in contact with conducting strip 115. There is no contact between conduction strips 106 and 116, 107 and 117, and 108 and 118.

Alignment may be evaluated as follows. Conducting strips 101-108 are held at a voltage Vdd (logic 1) by a voltage source 120. Conducting strips 111-118 are individually connected to a node 151 of a detection circuit 150, shown in FIG. 1C. Detection circuit 150 consists of a voltage meter 153 and a resistance 152 coupling node 151 to a reference voltage (logic 0). When node 151 is connected to conducting strips 111-115, voltage meter 153 detects a logic 1. When node 151 is connected to conducting strips 116-118, voltage meter 153 detects a logic 0. Thus detection circuit 150 detects a voltage transition between conducting strip 115 and conducting strip 116.

Figure 1B:
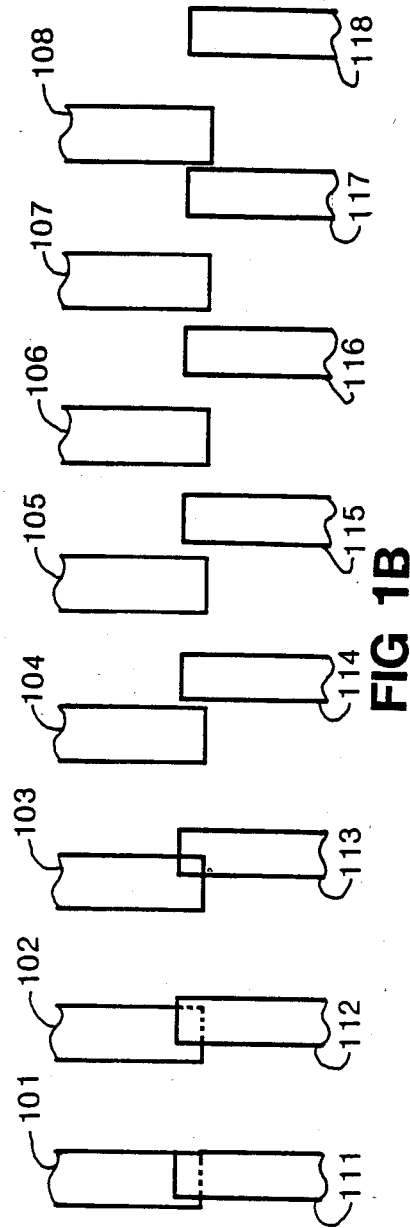

In FIG. 1B, the second conducting layer has been moved to the right relative to the first conducting layer. Therefore, conducting strips 111-118 have moved to the right with respect to conducting strips 101-108. Now, when conducting strips 111-118 are individually connected to node 151, detection circuit 150 detects a voltage transition between conducting strip 113 and conducting strip 114. Determination of where a voltage transition occurs, therefore, indicates the relative positioning of the first and second detecting layers. Placing verniers such as that shown in FIG. 1A vertically (in the Y direction) and horizontally (in the X direction) on an IC, it is possible to determine alignment of layers in both the X direction and the Y direction.

Figure 1F:
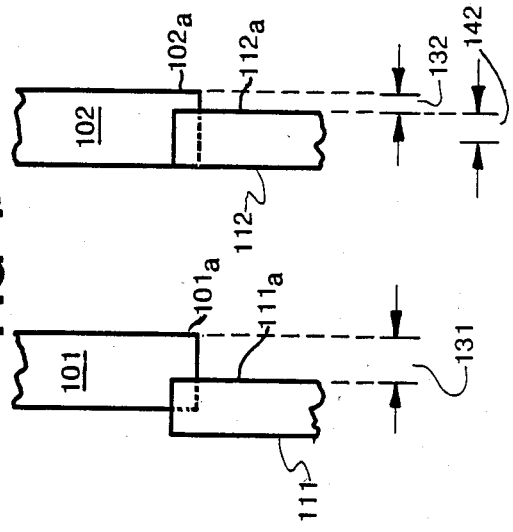
Figure 1C:
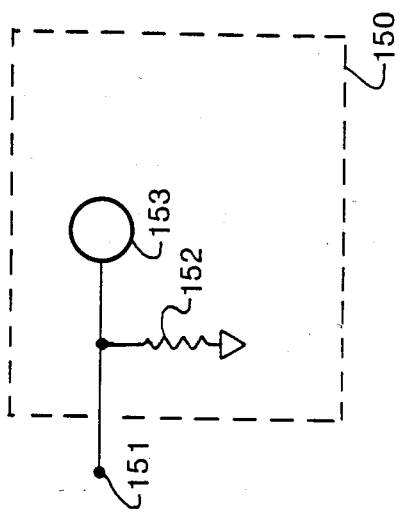
Figure 1D:
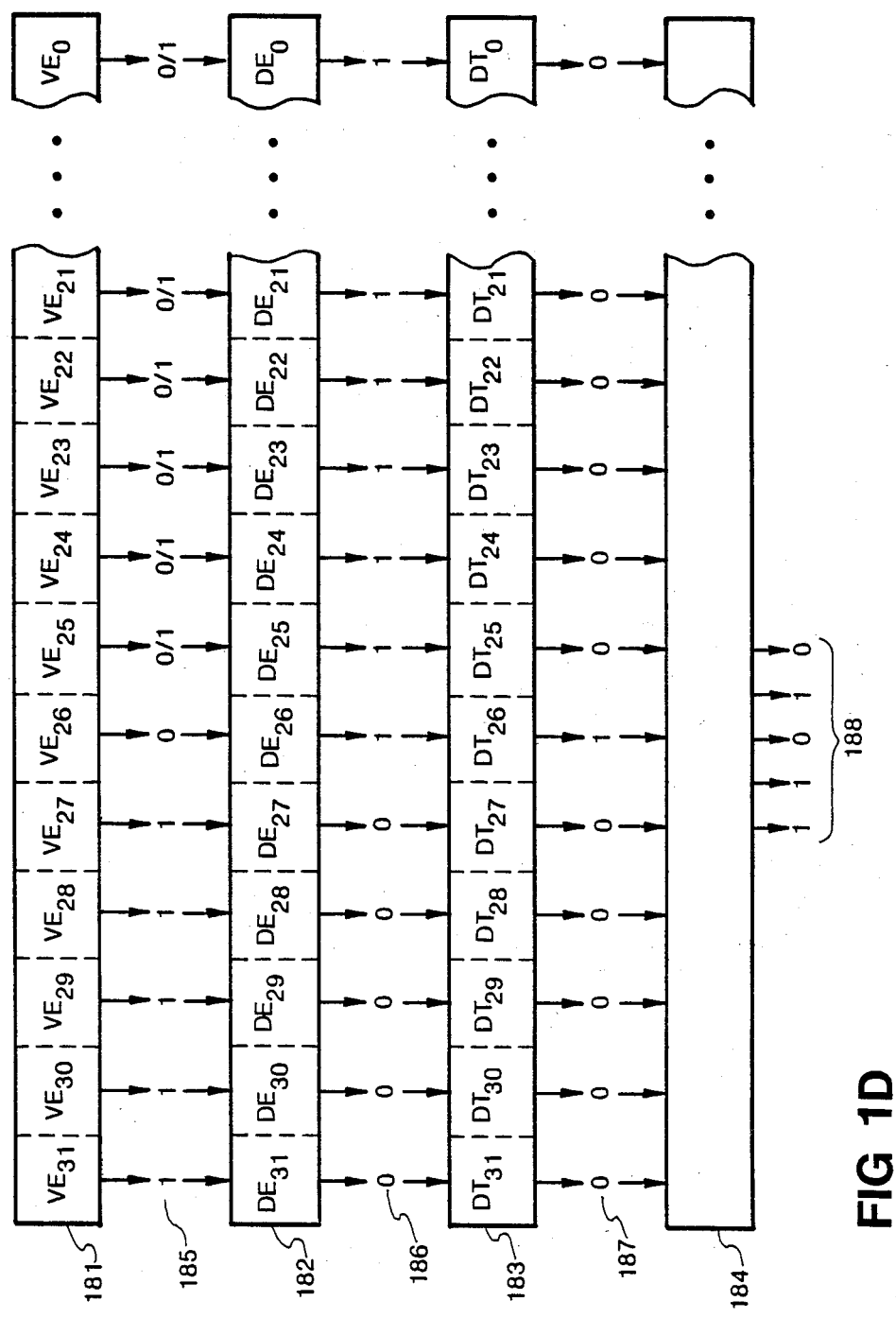

FIG. 1D is a block diagram showing a vernier 181 with 32 vernier elements, labelled $VE_{31}$-$VE_0$ (only vernier elements $VE_{31}$-$VE_{21}$ and $VE_0$ are shown), and additional circuitry which could be incorporated on an integrated circuit. Vernier outputs from vernier elements $VE_{31}$-$VE_0$ are coupled to a debouncing circuit 82. In FIG. 1D example values 185 are given for vernier outputs. That is, the outputs of vernier elements $VE_{31}$-$VE_{27}$ are labelled "1" ("1" represents a logic 1), the output for vernier element $VE_{26}$ is labelled "0" ("0" represents a logic 0), and the outputs of vernier elements $VE_{25}$-$VE_0$ are labelled "0/1" ("0/1" means the output can be either a logic 0 or a logic 1).

Debouncing circuit 182 comprises debouncing elements $DE_{31}$-$DE_0$ (only debouncing elements $DE_{31}$-$DE_{21}$ and $DE_0$ are shown). Generally, debouncing circuit 182 scans output from vernier elements starting with output from vernier element $DE_{31}$. As long as vernier elements $VE_{31}$-$VE_0$ output a logic 1, corresponding debouncing elements $DE_{31}$-$DE_0$ output a logic 0. However once debouncing elements detects a logic 0 output from a vernier element, the remaining debouncing elements output a logic 1. Example values 186, corresponding to example values 185, are given for debouncing circuit 182. As can be seen these values are logic 0 for vernier elements $DC_{31}$-$DC_{27}$ and logic 1 for the rest of the vernier elements.

From the above description it can be seen that debouncer circuit 182 assures that in outputs from its debouncing elements $DE_{31}$-$DE_0$ there is at most a single transition from logic 0 to logic 1. The location of the transition is at the highest order output of vernier elements $VE_{31}$14 $VE_0$ that contains a logic 0.

A detector circuit 183 receives output from debouncing circuit 182. Detector circuit 183 comprises detecting elements $DT_{31}$-$DT_0$ (only detecting elements $DT_{31}$-$DT_{21}$ and $DT_0$ are shown). At the detecting element corresponding to the location where outputs from debouncing circuit 182 makes its transition from logic 0 to logic 1, detecting circuit 183 produces a logic 1. For all other detecting elements, detecting circuit 183 produces a logic 0, as shown. Example values 187, corresponding to example values 186 and 185, show a logic 1 at the output of detecting element $DT_{26}$. The logic 1 output of detecting element $DT_{26}$ corresponds to the transition from logic 0 to logic 1 which occurs at the output of debouncing element $DE_{26}$.

A binary encoder 184 receives output from detecting circuit 183 and produces a binary coded number 188 which indicates the location of transition from logic 0 to logic 1 in the output of debouncing circuit 182. Binary coded number 188 corresponds to example values 187, i.e., binary coded number 188 is $1101_{base\ 2}$ which is equivalent to $26_{base\ 10}$, i.e., the location where the outputs of debouncing circuit 182 makes a transition from logic 0 to logic 1.

Figure 1E:
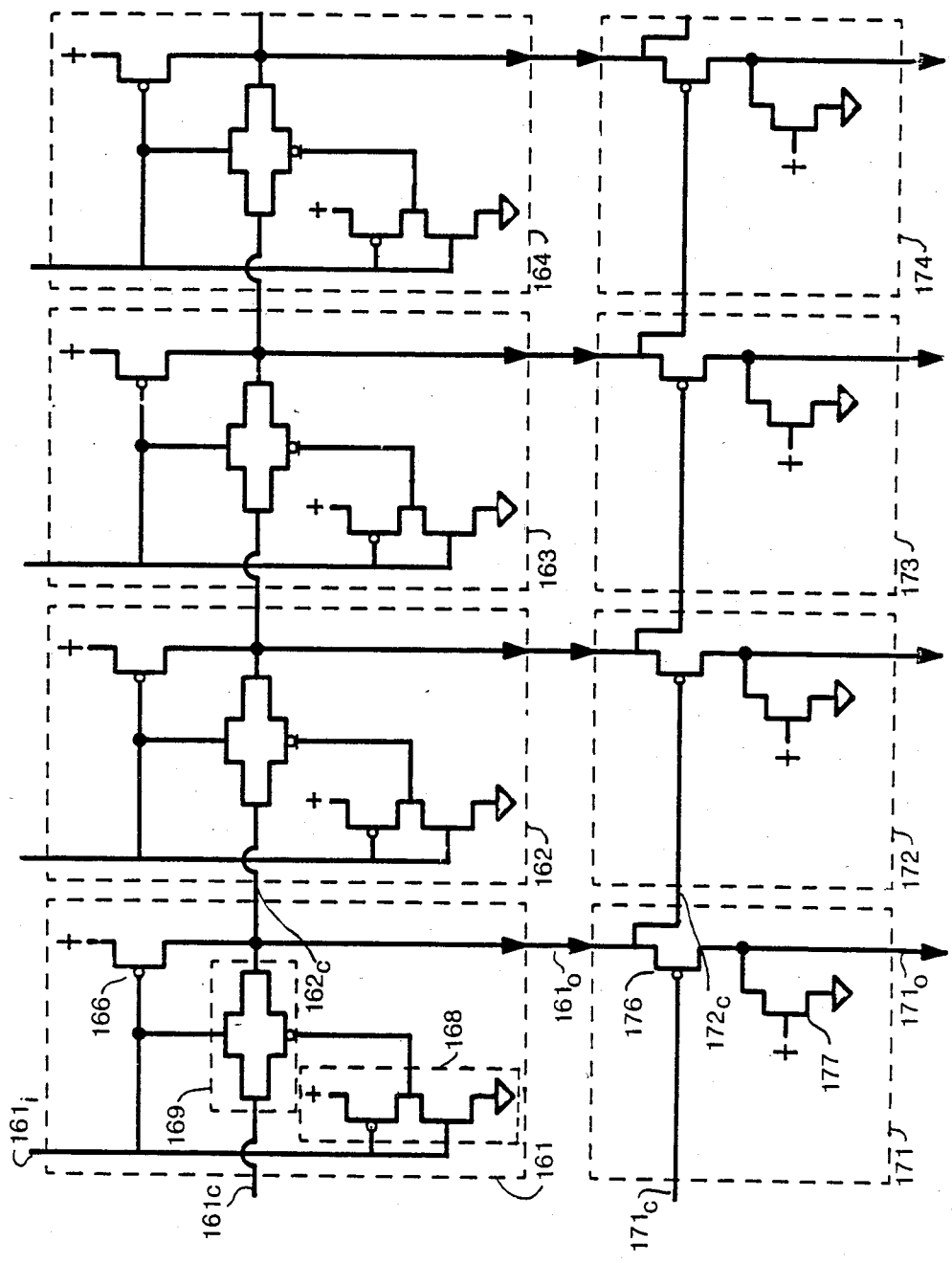

FIG. 1E shows an embodiment of debouncing elements within debouncing circuit 182, and detecting elements within detecting circuit 183. Debouncing elements 161-165 illustrate how debouncing elements $DE_{31}$-$DE_0$ may be constructed. For example, debouncing element 161 has an input 161$_i$ from a vernier element and an input 161$_c$ from a prior debouncing element. A transistor pair 168 operates as an inverter, and transistor pair 169 operates as a switch. When input 161$_i$ is at logic 0, transistor pair 169 is switched "off" and a transistor 166 is switched "on" so that a logic 1 (represented by a "+" in FIG. 1E) is propagated through to debouncing output 161$_o$ and to an input 162$_c$ of debouncing element 162. When input 161$_i$ is at logic 1, transistor 166 is switched "off" and transistor pair 169 is switched "on". Transistor pair 169 thus propagates the value on input 161$_c$ through to debouncing output 161$_o$ and input 162$_c$. Debouncing elements 162-164 operate in a manner similar to debouncing element 161. Detecting elements 171-174 illustrate how detecting elements $DE_{31}$-$DE_0$ may be constructed. A transistor 176 within detecting element 171 acts as a switch. When an input 171$_c$ from a prior detecting element is at logic 0, the value on output 171$_o$ is propagated through to an output 171$_o$. When input 171$_c$ is at logic 1, a depletion transistor 177 pulls the output 171$_o$ to logic 0 (logic 0 is represented by the "ground" in FIG. 1E). An input 172$_c$ to detecting element 172 is coupled to transistor 176 as shown. Detecting elements 172-174 operate in a manner similar to detecting element 171.

In FIG. 1A, each pair of conducting strips—e.g. 101 and 111, 102 and 112, 103 and 113, etc.—form a vernier element. In each vernier element, proceeding from left to right across FIG. 1A, the conducting strip on the second layer (conducting strips 111-118) is shifted to the right an incremental distance 142—see FIG. 1F—relative to the conducting strip on the first layer (conducting strips 101-108). Incremental distance 142 is uniform throughout all the vernier elements.

FIG. 1F shows how incremental distance 142 can be calculated using two vernier elements. A first distance 131 is the distance from a leading edge 111$a$ of conducting strip 111 to a leading edge 101$a$ of conducting strip 101. A second distance 132 is the distance from a leading edge 112$a$ of conducting strip 112 to a leading edge 102$a$ of conducting strip 102. Incremental distance 142 is the difference in length between first distance 131 and second distance 132.

Incremental distance 142 may be used in conjunction with binary coded number 188 to determine a quantity of misalignment. For example, if incremental distance 142 has a value D, and binary coded number 188 has a value $V_1$ but would have had a value $V_0$ if the first and second layers had been properly aligned, then a quantity of misalignment M could be calculated using the following formula:

$$M = D \times /V_0 - V_1/$$

Figure 2A:
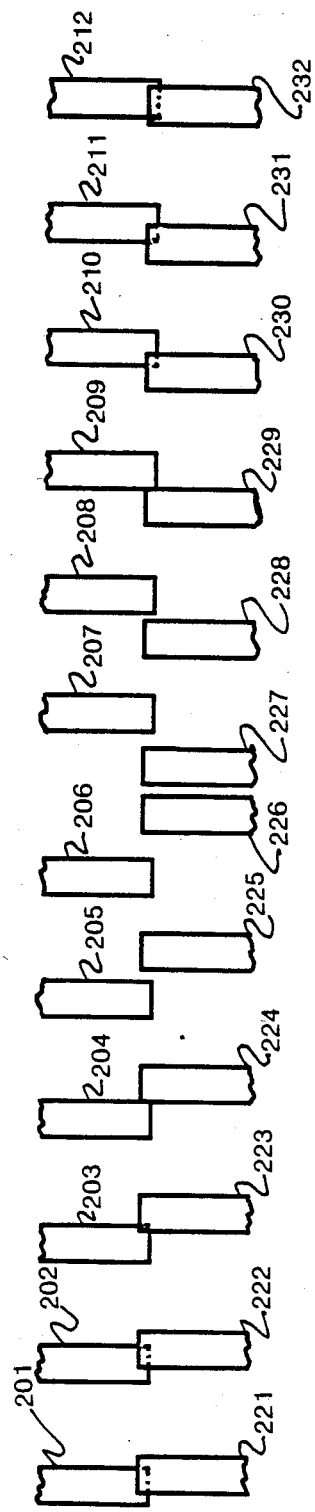
FIGS. 2A and 2B show a second embodiment of a vernier for aligning two conductive layers in accordance with a preferred embodiment of the present invention.

FIG. 2A shows an alternate arrangement of conducting strips. Conducting strips 201-212 are part of a first conducting layer and conducting strips 221-232 are part of a second conducting layer. In FIG. 2A, conducting strips 201-204 and 209-212 make contact with conducting strips 221-224 and 229-232 respectively. There is no contact between conducting strips 205-208 and conducting strips 225-228. Thus in FIG. 2A there are two transitions, a first transition between conducting strips 224 and 225, and a second transition between conducting strips 228 and 229.

Figure 2B:
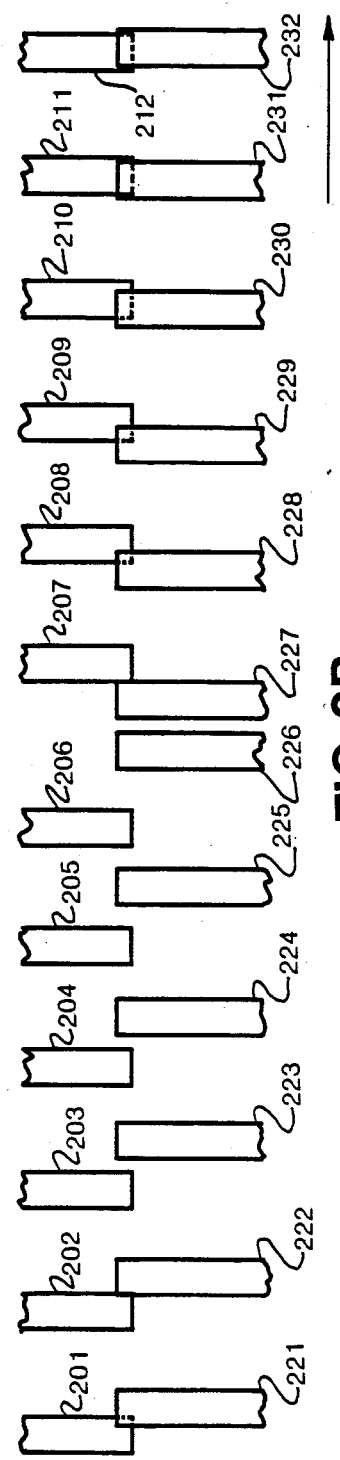

In FIG. 2B, the second conducting layer has been moved to the right relative to the first conducting layer. Thus in FIG. 2B the first transition occurs between conducting strips 222 and 223, and the second transition occurs between conducting strips 226 and 227.

Utilizing a vernier with two transitions, as in FIG. 2A, allows for greater process independence. For instance, if conducting strips 101-108 and 111-118 in FIG. 1A are formed by etching, under etch or over etch might result in a change in the location of the transition thereby introducing uncertainty into the determination of alignment. In FIG. 2A, under etch or over etch may result in a change in location of both transition points, but the relative center of the transition points will remain in the same location. The relative center of the transition points may then be used to determine the alignment of the layers.

Figure 3A:
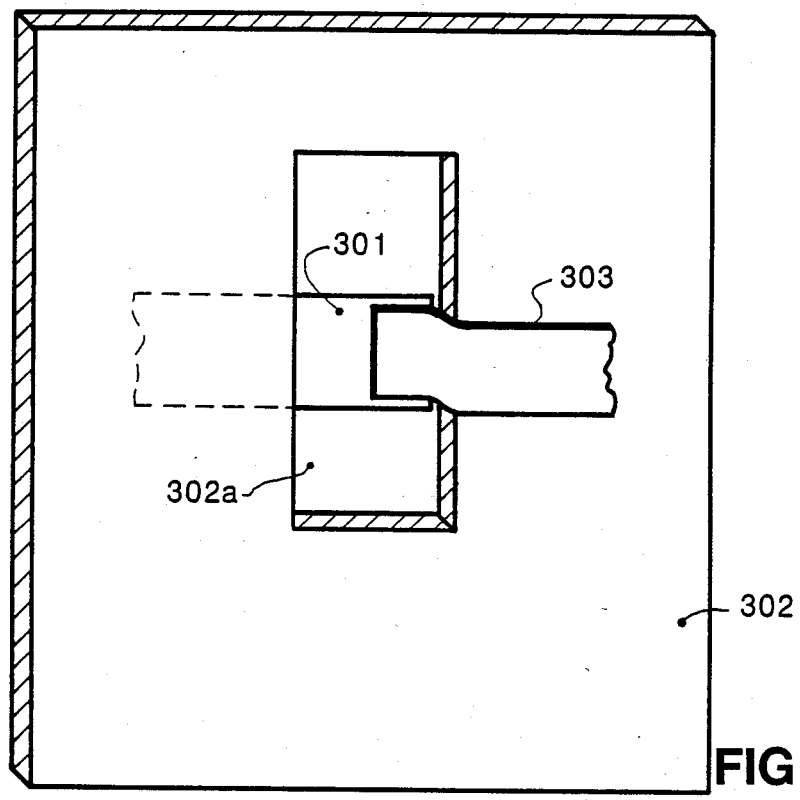
FIGS. 3A and 3B show an embodiment of a vernier for aligning a non-conductive layer between two conductive layers.
Figure 3B:
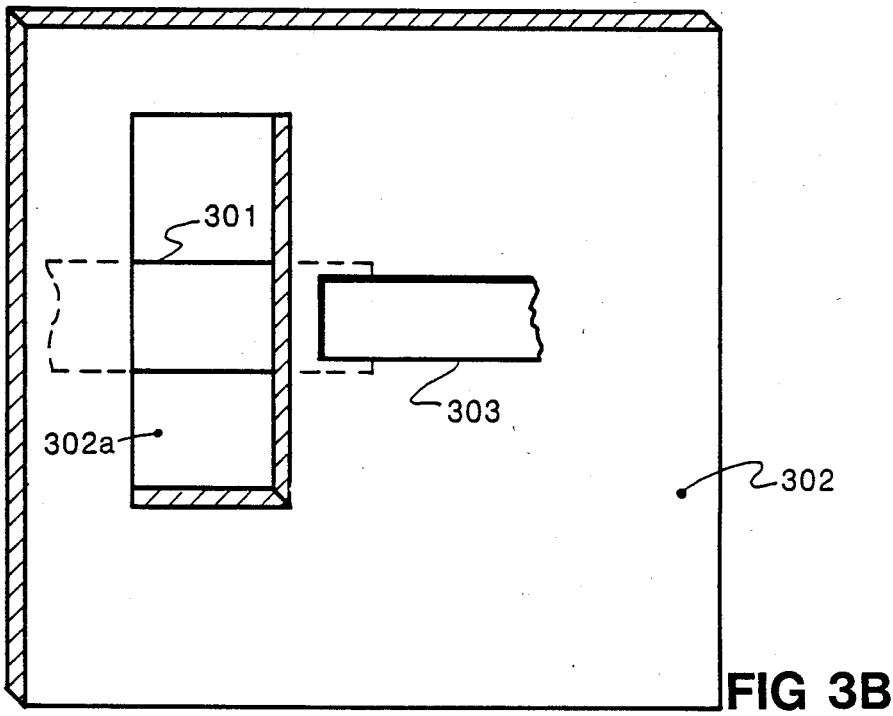

The verniers discussed above were designed to work between two conducting layers. Verniers may also be constructed which can be used for non-conducting layers. For instance, FIG. 3A shows a vernier element which may be used to construct a vernier for alignment of a first conducting layer having a conducting strip 301, a non-conducting layer 302 having a window 302$a$, and a second conducting layer having a conducting strip 303. In FIG. 3A conducting strip 301 makes contact with conducting strip 303 through window 302$a$. In FIG. 3B, the vernier element of FIG. 3A is shown with non-conducting layer 302 shifted to the left relative to the first and second conducting layers. In FIG. 3B conducting strip 301 does not make electrical contact with conducting strip 303 because window 302$a$ has shifted relative to conducting strips 301 and 303. Using the vernier element shown in FIGS. 3A and 3B, a vernier similar to the vernier of FIGS. 2A and 2B may be constructed.

Figure 4A:
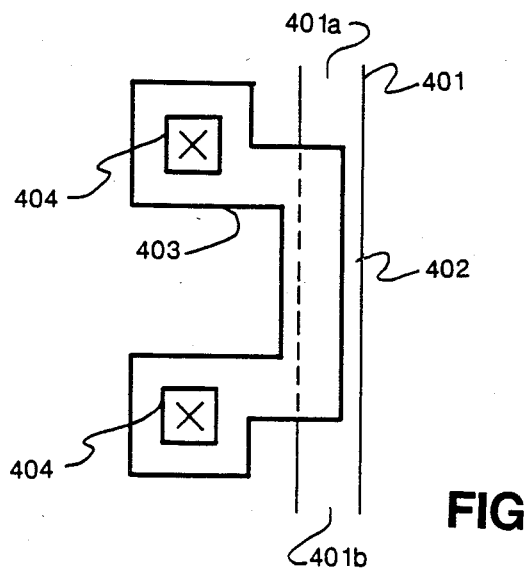
FIGS. 4A and 4B show an embodiment of a vernier for aligning a semiconducting layer to a capacitive layer.
Figure 4B:
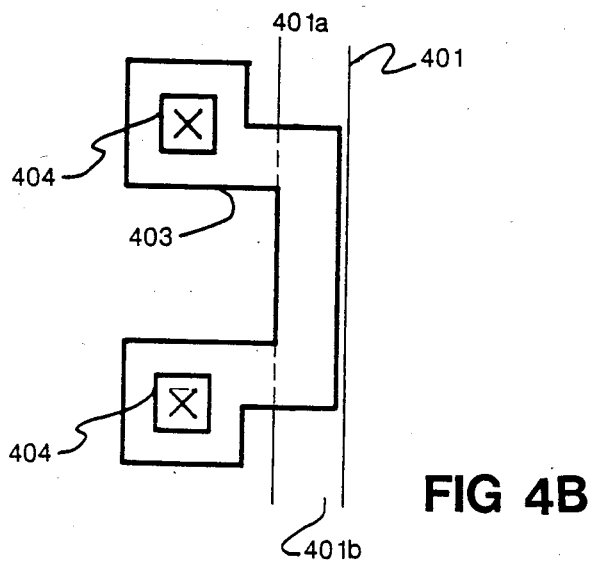

FIG. 4A shows a vernier element which may be used to construct a vernier for alignment of two semiconducting layers: an island (diffusion) layer having a semiconducting strip 401 and a poly-silicon layer having a gate 403. Through contacts 404, poly-silicon layer 403 is biased to a reference voltage (logic 0). The portion of semiconducting strip 401 immediately under gate 403 is biased to its non-conducting state. However a conducting channel exists which allows conduction between a location 401$a$ and 401$b$ on semiconducting strip 401. In FIG. 4B, the vernier element of FIG. 4A is shown with the island layer shifted to the right relative to the poly-silicon layer. Thus, in FIG. 4B, conducting channel 402 disappears and there is no conduction between location 401$a$ and 401$b$. Using the vernier element shown in FIGS. 4A and 4B, a vernier similar to the vernier of FIGS. 2A and 2B may be constructed.

What is claimed is:

1. A device for evaluating alignment of a first layer on an integrated circuit with a second layer on the integrated circuit, the device comprising:
   a detecting means for electrically detecting misalignment between the first layer and the second layer, the detecting means including,
   a first plurality of conducting material sections on the first layer, and
   a second plurality of conducting material sections on the second layer, wherein each section of a first group of the first plurality of conducting material sections is electrically coupled to a corresponding section of a first group of the second plurality of conducting material sections, and each section of a second group of the first plurality of conducting material sections is electrically insulated from a corresponding section of a second group of the second plurality of conducting material sections; and an output means, coupled to the detecting means for producing an output which is an encoded representation of a quantity of misalignment, wherein the output means detects which sections are within the first group of the first plurality of conducting material sections and which sections are within the second group of the first plurality of conducting material sections in order to produce the encoded representation of the quantity of misalignment.

2. A device as in claim 1 wherein the first plurality of conducting material sections are arranged in a sequence so that when the first layer is aligned with the second layer, consecutive sections from the second group of the first plurality of conducting material sections separate some sections in the first group of the first plurality of conducting material sections from other sections in the first group of the first plurality of conducting material sections.

3. A device for evaluating alignment of a first layer on an integrated circuit with a second layer on the integrated circuit, wherein the first layer comprises conducting material and the second layer comprises insulating material, wherein the integrated circuit has a third layer comprising conducting material, and wherein the second layer overlays the third layer and the first layer overlays the second layer, the device comprising:
  detecting means for electrically detecting misalignment between the first layer and the second layer, the detecting means including,
    a first plurality of conducting material sections on the first layer;
    a second plurality of conducting material sections on the third layer;
  output means, coupled to the detecting means for producing an output which is an encoded representation of a quantity of misalignment;
  wherein each section of a first group of the first plurality of conducting material sections is electrically coupled through windows within the insulating material to a corresponding section of a first group of the second plurality of conducting material sections, and each section of a second group of the first plurality of conducting material sections is electrically insulated by the insulating material from a corresponding section of a second group of the second plurality of conducting material sections.

4. A device as in claim 3 wherein the output means determines which sections are within the first group of the first plurality of conducting material sections and which sections are within the second group of the first plurality of conducting material sections in order to produce the encoded representation of the quantity of misalignment.

5. A device as in claim 4 wherein the first plurality of conducting material sections are arranged in a sequence so that when the first layer is aligned with the second layer, consecutive sections from the second group of the first plurality of conducting material sections separate some sections in the first group of the first plurality of conducting material sections from other sections in the first group of the first plurality of conducting material sections.

6. A device for evaluating alignment of a first layer on an integrated circuit with a second layer on the integrated circuit, the device comprising:
  detecting means for electrically detecting misalignment between the first layer and the second layer, the detecting means comprising,
    a plurality of capacitive material sections on the second layer, and,
    a plurality of semiconducting material sections on the first layer, each semiconducting material section having a first end, a second end, and a channel, each channel in a first group of the plurality of semiconducting material sections having a first conductivity value and each channel in a second group of the plurality of semiconducting material having a second conductivity value, the conductivity value of each channel depending upon the relative position of the semiconducting material section containing each channel with capacitive material sections associated with each semiconducting material section; and,
  output means, coupled to the detecting means for producing an output which is an encoded representation of a quantity of misalignment.

7. A device as in claim 6 wherein the detecting means additionally comprises a current source coupled to the first end of each of the semiconducting material sections, and a plurality of current detection means each current detecting means coupled to the second end of the semiconducting material sections, for detecting whether each semiconducting material section has the first conductivity value or the second conductivity value.

8. A device as in claim 7 wherein the plurality of semiconducting material sections are arranged in a sequence so that when the first layer is aligned with the second layer, consecutive sections from the second group of the plurality of semiconducting material sections separate some sections in the first group of the plurality of semiconducting material sections from other sections in the first group of the plurality of semiconducting material sections.

* * * * *